Aug. 4, 1936. O. U. ZERK 2,049,533
SPARE WHEEL AND TIRE COVER
Filed April 24, 1935 3 Sheets-Sheet 2

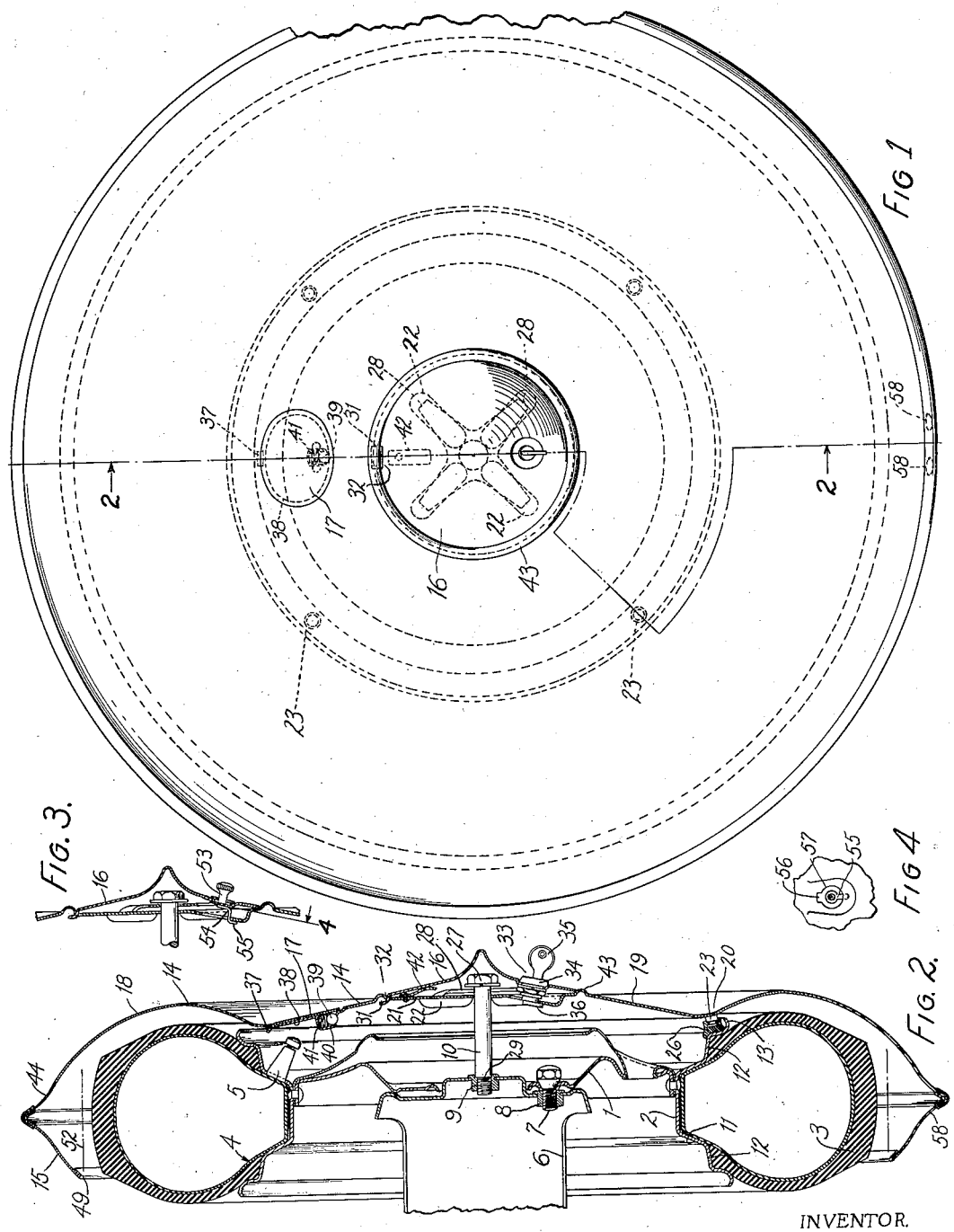

INVENTOR.
Oscar U. Zerk.
BY
ATTORNEY.

Aug. 4, 1936. O. U. ZERK 2,049,533
SPARE WHEEL AND TIRE COVER
Filed April 24, 1935   3 Sheets-Sheet 3

INVENTOR.
Oscar U. Zerk.
BY
ATTORNEY.

Patented Aug. 4, 1936

2,049,533

UNITED STATES PATENT OFFICE 2,049,533

SPARE WHEEL AND TIRE COVER

Oscar U. Zerk, Chicago, Ill.

Application April 24, 1935, Serial No. 18,014

4 Claims. (Cl. 150—54)

This invention relates to covers for the spare wheels and tires of automotive vehicles.

Covers have been used heretofore for the spare tire or spare tire and wheel carried exteriorly of the automotive vehicle. The construction of such prior tire and wheel covers, however, has caused them to be out of harmony in appearance with the rest of the vehicle because of the universal trend toward streamlining in the car design. The advent of streamlining in automobile construction has been carried beyond streamlining of merely the main body of the car, and other external parts of the vehicle are now streamlined, such as fenders, headlights, etc. But streamlining has not been applied, up to the present time, to the covers of spare wheels and tires.

The absence of streamlining in the spare tire and wheel cover not only detracts from the general harmony of contour of the vehicle but causes the wheel and tire cover to present to the air flowing around the car in motion, air flow resisting surfaces tending to defeat the result of streamlining other parts of the car. For example, when the spare wheel and tire is carried on the rear of a vehicle having a streamlined body, the powerful draft in a downwardly angular direction at the rear of the car induced by the streamlining of the body, strikes upon the spare wheel and tire and its cover, and because of the absence of streamlining in the cover, creates at the lower rear end of the wheel and tire a vacuum or partial vacuum retarding or opposing forward movement of the car, and lifting clouds of dust from the road.

It is an object therefore of this invention to provide for the streamlining of spare wheel and tire covers.

Another object of my invention is to provide an improved spare wheel and tire cover adaptable for use upon wheels the tires of which may be of different diameters and different widths.

Another object is to provide an improved tire cover or wheel and tire cover which can be applied to the tire or wheel in covering position or removed therefrom by movement axially of the wheel or tire.

Another object is to provide a tire cover having an improved two-piece construction of the peripheral portions covering the tire.

Another object is to provide a construction of spare wheel and tire cover admitting of streamlining in both the side elevational and front elevational aspects.

Another object is to provide a construction of wheel and tire cover by which streamlining contours may be applied to a non-streamlined tire cover.

Other objects of my invention will be apparent to those skilled in the art to which my invention appertains. My invention is fully disclosed in the following description taken in connection with the accompanying drawings, in which:

Fig. 1 is a front elevational view of a spare wheel and tire with a cover embodying one form of my invention applied thereto;

Fig. 2 is a cross-sectional view taken approximately from the plane 2—2 of Fig. 1;

Fig. 3 is a fragmentary view similar to a part of Fig. 2 but illustrating a modification;

Fig. 4 is a fragmentary view taken approximately from the plane 4 of Fig. 3;

Figure 5:
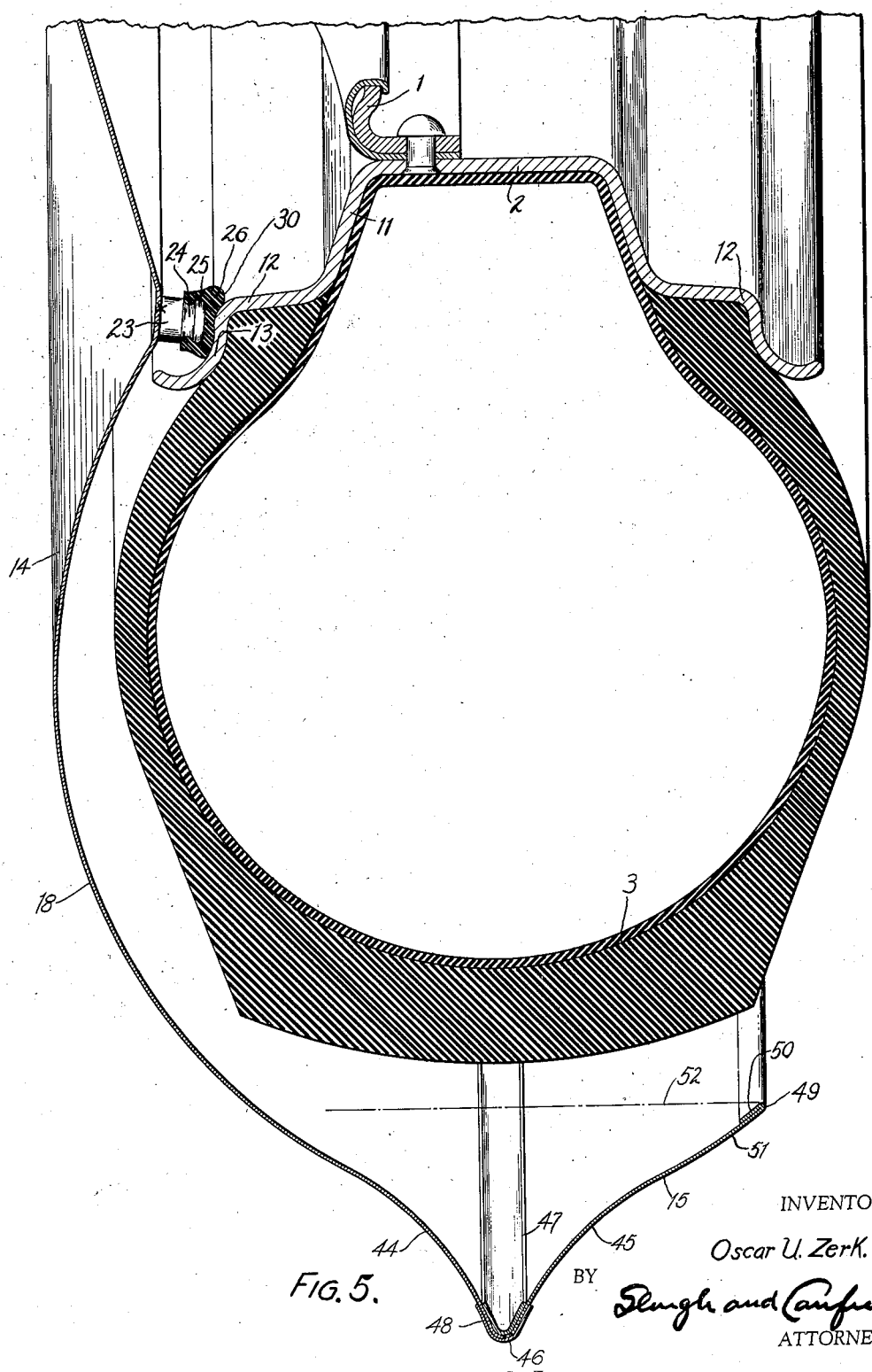
Fig. 5 is a view illustrating to an enlarged scale a part of Fig. 2, the sectional plane being rotated through 180°.

In the drawings, referring to the form of my invention illustrated in Figs. 1 to 5 inclusive, the cover is illustrated as applied to a wheel comprising a central spider 1, a tire supporting rim 2 and a tire 3 on the rim, the tire having an inner tube 4 adapted to be inflated through a tire stem 5. The wheel illustrated is the spare wheel of an automotive vehicle and is illustrated as mounted upon a spare wheel support 6 by bolts 7, only one of which is shown, projected through suitable perforations in the spider 1 and threaded into suitable threaded nut-like receptacles 8 on the support 6.

The spare wheel support 6, in the preferred embodiment illustrated, is provided with an axially disposed or central nut receptacle 9 into which is threaded the end of a bolt 10, to be more fully described, for securing the cover on the wheel.

The rim illustrated is of the form having, besides the usual channel-form portion 11 in which the inner tube is seated, angle section portions 12—12 in which the casing is seated, the angle section portions 12 providing an axially outwardly facing annular shoulder 13 utilized in the practice of my invention in a manner to be described.

The cover comprises in general a sheet metal stamping 14 and an annular sheet metal piece 15 comprising the cover proper, and a central cap 16 of sheet metal and a lid 17 of sheet metal for covering an aperture through which access is had to the valve stem 5, which parts will now be described, the cover being viewed in the drawings as mounted upon a spare wheel and tire supported at the rear end of an automotive vehicle.

The cover element 14, preferably a one-piece sheet metal stamping, is formed with a rearwardly convex annular portion 18 for covering the rearward face of the tire 3 and a central wheel covering portion 19 which also preferably is rearwardly convex, the two portions being joined by an annular rearwardly concave portion 20. The wheel covering portion 19 is provided at the center thereof with a flat portion 21 in which are pressed rearwardly concave radially extending ribs 22 for stiffness. On the inner or forward side of the annular depressed portion 20 is provided a plurality such as four circumferentially spaced studs 23—23 which are preferably spot-welded to the metal of the cover (see Fig. 5) and have annular grooves 24 to provide heads 25; and rubber caps 26 are secured to the ends of the studs 23 by telescoping them over the heads 25 with the rubber contracted into the grooves 24. The caps 26 rest upon the shoulder portion 13 of the rim above described and position the cover on the wheel and with respect to the tire, and the cover is secured on the wheel by the bolt 10 above referred to, the shank of which is projected through a central perforation in the flat portion 21 of the cover and threaded into the nut receptacle 9 of the wheel support above described.

In the preferred construction, the shank 10 of the bolt is also first projected through a central perforation in a star-form sheet metal spring 28 having star points or spokes seated in the concave sides of the ribs 22, and the star-shaped spring being dished rearwardly convex. By this construction, when the bolt 10 is turned to screw it into the receptacle 9, the head 27 of the bolt engages the star-shaped spring and compresses it at the center, thus exerting resilient thrust inwardly on the flat portion 21 of the cover and thereby the rubber caps are cushioningly compressed upon the shoulder portion 13 of the wheel rim.

The bolt 10 preferably has a shoulder 29 which limits its axially inward movement when the spokes of the star-shaped spring have been resiliently bent to a predetermined degree sufficient to resiliently hold the cover on the wheel through the cushioning engagement therewith of the rubber caps 26.

By suitably positioning the rubber caps 26, portions thereof as shown at 30, Fig. 5, may overlap the angular portion 12 of the rim to prevent radial shifting of the cover; and the frictional engagement of the caps 26 with the shoulder portion 13 effectively prevents circumferential or rotative shifting of the cover on the wheel. The bolt 10 may be secured against unscrewing by any lock washer or like means.

The cap element 16 of the cover is in the form of a circular stamping generally conoidal in form, rearwardly convex, the portions nearer the center being more deeply inclined to render the cap element of streamlined form. At the upper peripheral portion of the stamping, a tongue 31 is formed on the stamping and is adapted to be projected into a perforation 32 in the cover element 14 to function as a removable hinge connection for the cap element to secure the cap element to the cover element 14 at one side of the cap. At the opposite side, the cap is secured by a lock device shown generally at 33, and comprising a lock construction 34 operable by a key 35 secured upon the cap element 16 and having a finger 36 which, when the cap is placed in position, projects through a perforation in the flat portion 21 of the cover and may be turned by the key 35 to overlap the periphery of the perforation to thereby lock the cap element 16 upon the cover element 14.

The cap element 16 covers the bolt head 27, spring 28 and ribbed flat portion 21 of the cover, and to remove it to give access to the bolt head 27, it may be unlocked by the key 35 and then the cap may be rotated around a hinge connection 31—32 to a suitable angular position and removed by withdrawing the tongue 31 out of the perforation 32 in a well known manner.

It will be observed that when the cap 16 is locked in position, it prevents access to the bolt 10 and thus prevents removal of the cover and thereby prevents access to the attaching screws 7 of the wheel. Thus, by a very simple construction, theft of the cover itself and of the wheel and tire is prevented.

The lid 17 above referred to is preferably a circular or oval-shaped stamping having a tongue 37 insertable into a perforation in the cover to provide a detachable hinge connection therewith. The aperture through which access is had to the tire stem 5 is indicated at 38. On the inner side of the lid 17 and adjacent the perforation periphery is a device for detachably latching the lid to the cover comprising a ball 39 a fragment of which projects outwardly from an enclosing sheet metal housing 40 therefor and spring-pressed by a spring 41. The projecting fragment of the ball 39 overlaps the periphery of the aperture 38 and normally holds the lid on the cover in cooperation with the tongue 37, but the lid may be removed by prying it off, the spring 41 permitting the ball 39 to yieldingly move inwardly for this purpose. The lid 17 is replaced in the reverse manner.

To insure that the cap element 16 will not be loose and liable to rattle, a sheet metal spring 42 may be provided secured to the flat portion 21 of the cover and resiliently engaging the inner side of the cap 16.

To further render the cap thief-proof, its periphery is surrounded by an outwardly convex bead 43 pressed in the cover element 14. The bead 43 will prevent the projecting of the end of a screw-driver or like tool under the edge of the cap element 16 whereby otherwise it might be forceably pried off to give access to the bolt 10.

Returning now to the tire covering portions 18 and 15 of the cover, these two portions are joined together on a plane which normally will be the medial plane of the tire. The rearwardly convex tire face covering annular portion 18, in portions nearer and nearer the said medial plane, changes from convex to concave as shown at 44; and the annular piece 15 has a corresponding concave portion 45, the two portions meeting each other in an outwardly radially convex ridge 46 embracing preferably an acute angle therebetween which gives to the periphery of the cover a streamlined configuration, and preferably the ridge extends completely around the cover.

To join the portions 18 and 15 together to provide the said concaved ridge form, a ring 47 generally V-shaped in cross-section to conform to the inner surface of the concave portions 44 and 45, is spot-welded to the portions 44 and 45 to rigidly and permanently connect them.

In the preferred practice of my invention, a ring generally V-shaped in cross-section of chromium-plated and polished metal 48 is formed over the said peripheral ridge to cover the juncture 46 between the two portions 44 and 45 and to give a finished aesthetic quality to the cover. The ring 48 may be attached as described in any suitable manner, one method being that known as spinning.

The periphery of the cover thus provided will have a form which may be referred to as concave V-form in section. The rearward edge 49 of the annular cover piece 15 is preferably folded over as illustrated at 50 to give a finished appearance to this edge and to reinforce the same. Adjacent the edge 49, a portion 51 of the piece 15 may be of a curvature slightly reversed with respect to the portion 45 to correspond to the homologous parts of the cover portion 18 to render the generally peripheral portions of the cover symmetrical with respect to the medial plane.

The edge 49 provides a forward opening in the cover, which opening is preferably circular, and the diameter of this opening is made greater than the maximum outside diameter of the largest size tire 3 which will be used on the rim 2; so that the cover may be assembled upon the wheel and tire or removed therefrom by straight-line axially-directed movement during which the edge 49 will travel along the broken line 52, clearing the outer periphery of the tire tread portion. In like manner, the tire face cover portion 18 may be, and preferably is, formed and positioned to clear the face of the widest tire 3 which may be used on the rim 2; whereby for a single construction of cover, tires of varying outside diameter and width may be used on the wheels of the vehicle and the spare one thereof covered as above described.

Apart from the chromium-plated band 48, the surfaces of the cover may be finished as desired, preferably in a contrasting color, corresponding to the color of the body of the vehicle.

In Figs. 3 and 4 I illustrate a modification of the latching means for the central cover cap element 16 wherein is shown, instead of a key-operated lock, a knurled knob 53 secured to a rotary latch element 54 having a finger 55, which when the knob 53 is in one rotated position, may be inwardly inserted through a notch 56 in the periphery of a perforation 57 in the sheet metal of the cover and which when rotated through 180° will overlap the edge of the perforation periphery as shown in Figs. 3 and 4 to attach the cap element to the cover proper. The operation of this form is substantially the same as that of the form of Figs. 1 and 2, and while not rendering the cover thief-proof, provides a cheaper construction thereof.

Perforations 58—58 may be provided in the lower peripheral portion of the cover through which water may drain out.

Figure 6:
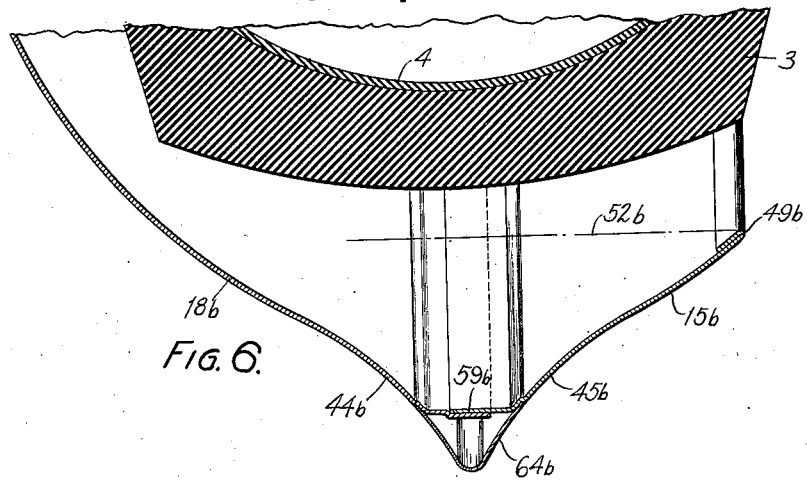
Figs. 6, 7 and 8 are fragmentary views similar to Fig. 3 and illustrating modified embodiments of my invention.
Figure 7:
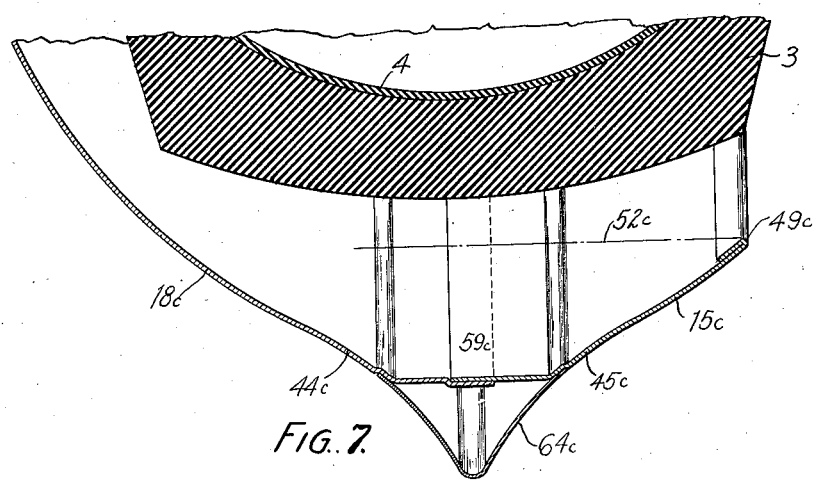
Figure 8:
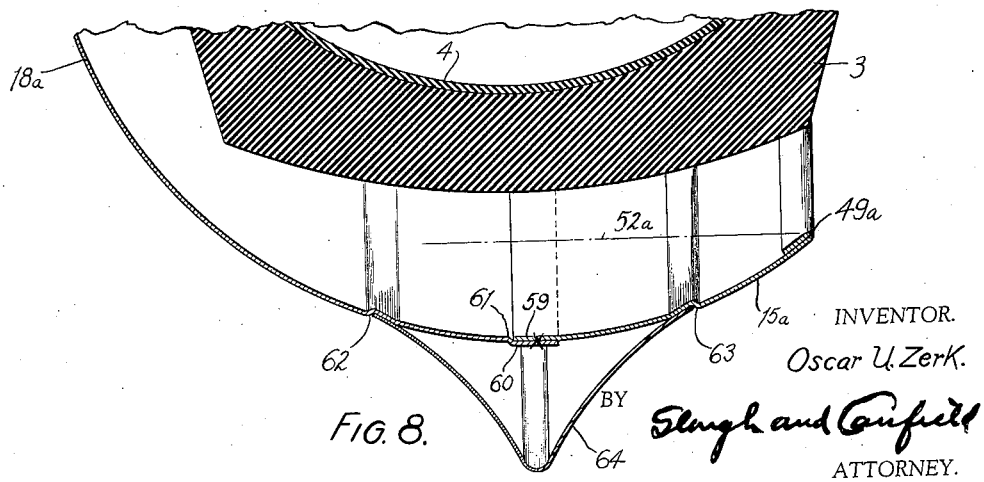

In Figs. 6, 7 and 8 are illustrated other forms of parts and other constructions by which the concaved V-sectional form of the cover periphery may be provided. In Fig. 8 the annular piece of the cover, 15a, and the tire face cover portion 18a approach the medial plane of the tire or tire cover as shown in Fig. 8 without reversal of curvature, i. e. more continuously convex and substantially circular, the two parts 15a and 18a overlapping as at 59 whereat they may be rigidly secured together by spot-welding, one of the two parts, such for example as the part 18a, having an offset overlap 60 providing a shoulder 61 to position the two parts 15a and 18a before welding.

Forwardly and rearwardly of the overlap joint construction thus provided, the portions 18a and 18b are, respectively, indented to provide annular shoulders 62 and 63. An annular ring 64 of concave V in cross-section is fitted around the periphery of the cover with the annular edges thereof seated against the shoulders 62 and 63 adjacent to which it may be spot-welded to the portions 15a and 18a to rigidly secure it thereto. In some cases the ring 64 may fit sufficiently well not to require spot-welding thereof; and in other cases where the ring 64 is spot-welded to the portions 15a and 18a, spot-welding at the overlap joint 59 may be dispensed with.

The ring 64 may be made from chromium-plated metal and polished for purposes hereinbefore referred to.

In some prior tire covers there is provided a tire covering peripheral portion of generally circular or outwardly concave configuration resembling in general the portions 18a and 15a of the form of Fig. 8, although not having the edge such as 49a of greater diameter than the tire as shown by the line 52a, and such covers while not functioning nor susceptible of operation as the cover herein described, may in accordance with my invention be converted into streamline covers by adding thereto a ring such as the ring 64.

In Figs. 6 and 7 are illustrated streamlined cover peripheral portions constructed in general like that of Fig. 8 but having portions 18b and 18c and portions 15b and 15c which do not continue outwardly convex but reverse into the outwardly concave form as at 44b and 44c and at 45b and 45c adjacent the medial ridge, and the V-section rings 64b and 64c being joined to these outwardly concave portions. In these forms also, the overlap at 59b and 59c is made upon generally cylindrically formed annular edge portions of the two pieces 15b, 18b and 15c, 18c, respectively.

My invention is not limited to the exact details shown and described. Many modifications and changes may be made therein within the spirit of my invention and without sacrificing its advantages, and within the scope of the appended claims.

I claim:

1. A cover for spare tires comprising two dished concavely confronting sheet metal stampings integrally joined at generally peripheral portions thereof, one stamping having a perforation larger than the outer tire diameter for axially telescoping over the tire, to cover an annular portion of the tire tread, the other stamping covering the remaining annular tire tread portion and the outer face of the tire, the tread covering portion thus formed having a medial portion of greater diameter than the said perforation, said medial portion comprising an outwardly convex V-form ridge extending substantially entirely around the cover, and the apex and at least a portion of the sides of the ridge being formed from a generally V-form element secured to the cover.

2. A cover for spare tires comprising two dished concavely confronting sheet metal stampings integrally joined at generally peripheral portions thereof, one stamping having a perforation larger than the outer tire diameter for axially telescoping over the tire, to cover an annular portion of the tire tread, the other stamping covering the remaining annular tire tread portion and the outer face of the tire, the tread covering portion thus formed having a medial portion of greater diameter than the said perforation, said medial portion comprising an outwardly convex V-form ridge extending substantially entirely around the cover, and the apex and at least a portion of the sides of the ridge being formed from a generally V-form element secured to the cover and covering the juncture of the two stampings.

3. A cover for spare tires comprising two dished concavely confronting sheet metal stampings integrally joined at generally peripheral portions thereof, one stamping having a perforation larger than the outer tire diameter for axially telescoping over the tire to cover an annular portion of the tire tread, and the other stamping covering the remaining annular tire tread portion and the outer face of the tire, the tread covering portion thus formed having a medial portion of greater diameter than the said perforation, said medial portion being provided with an internal groove adjacent the juncture of the two stampings and a separate metal band disposed in the groove and a second metal band encircling said medial groove portion, both said bands being secured to the cover, and covering the juncture of the two stampings.

4. A cover for spare tires comprising two dished concavely confronting sheet metal stamping integrally joined at generally peripheral portions thereof, one stamping having a perforation larger than the outer tire diameter for axially telescoping over the tire, to cover an annular portion of the tire tread, the other stamping covering the remaining annular tire tread portion and the outer face of the tire, the tread covering portion thus formed having a medial portion of greater diameter than the said perforation, said medial portion comprising an outwardly convex V-form ridge extending substantially entirely around the cover, and formed from adjacent peripheral portions of the joined stampings, and the apex and, at least, a portion of the sides of the ridge being covered by a generally V-form element secured to the cover.

OSCAR U. ZERK.